(12) United States Patent
Ruperte Sanchez et al.

(10) Patent No.: US 8,733,800 B1
(45) Date of Patent: May 27, 2014

(54) TUBE HAVING AN INTEGRAL, SPRING-LOADED, SPHERICAL JOINT

(71) Applicant: United Technologies Corporation, Hartford, CT (US)

(72) Inventors: Jose E. Ruperte Sanchez, Jupiter, FL (US); Russell B. Hanson, Jupiter, FL (US); Kevin J. Low, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/681,734

(22) Filed: Nov. 20, 2012

(51) Int. Cl.
*F16L 27/04* (2006.01)

(52) U.S. Cl.
USPC ........... 285/268; 285/269; 285/224; 285/302; 60/765

(58) Field of Classification Search
USPC ................ 285/268, 269, 224, 302; 60/765
See application file for complete search history.

(56) References Cited

U.S. PATENT DOCUMENTS

| | | | | |
|---|---|---|---|---|
| 99,003 A * | 1/1870 | Robbins | ......................... | 285/268 |
| 918,144 A * | 4/1909 | Greenlaw | ..................... | 285/269 |
| 1,202,502 A * | 10/1916 | Forth | ............................ | 285/268 |
| 1,434,631 A * | 11/1922 | Reynolds | ..................... | 285/268 |
| 1,915,100 A * | 6/1933 | McLaughlin | ................. | 285/269 |
| RE23,298 E * | 11/1950 | Monroe | ......................... | 285/269 |
| 2,616,728 A | 11/1952 | Pitt | | |
| 2,693,971 A * | 11/1954 | Harrison | ....................... | 285/269 |
| 2,840,394 A * | 6/1958 | Rohr | ............................. | 285/268 |
| 3,047,315 A * | 7/1962 | Kinnison | ...................... | 285/269 |
| 3,851,900 A | 12/1974 | Camboulives et al. | | |
| 4,054,306 A | 10/1977 | Sadoff, Jr. et al. | | |
| 4,570,440 A * | 2/1986 | Doran | ........................... | 285/268 |
| 4,583,768 A * | 4/1986 | Aoki et al. | .................... | 285/268 |
| 4,641,861 A * | 2/1987 | Scoboria | ....................... | 285/268 |
| 4,928,998 A | 5/1990 | Brandener | | |
| 5,209,428 A | 5/1993 | Bevilaqua et al. | | |
| 5,335,947 A * | 8/1994 | Remsburg | ...................... | 285/268 |
| 5,385,015 A | 1/1995 | Clements et al. | | |
| 6,312,019 B1 | 11/2001 | Nakazumi et al. | | |
| 6,709,023 B2 * | 3/2004 | French | .......................... | 285/224 |
| 7,784,835 B1 * | 8/2010 | Keays et al. | .................. | 285/224 |

* cited by examiner

*Primary Examiner* — David E Bochna
(74) *Attorney, Agent, or Firm* — Malcolm J. Chisholm, Jr.

(57) ABSTRACT

The tube (60) includes first and second portions (66, 58) that each have mating spherical sections (82, 84) at adjacent ends (72, 74) of each portion (66, 68). The second portion (68) includes a spring sleeve (92) configured to surround an outlet end (72) of the first portion (66). A spring (102) is captured inside the spring sleeve (92) and secured between a retaining clip (100) and a shoulder (88) protruding from the exterior surface of an outlet end (72) of the first portion (66) to maintain fluid seals between the spherical sections (82, 84). The spherical sections (82, 84) permit slidable motion relative to each other thereby facilitating rotational and angular motion between the tube portions (66, 68). One of the two portions (66, 68) may include a telescope mount (110) to permit limited axial motion of the tube (60).

8 Claims, 3 Drawing Sheets

TUBE HAVING AN INTEGRAL, SPRING-LOADED, SPHERICAL JOINT

STATEMENT REGARDING FEDERALLY SPONSORED RESEARCH OR DEVELOPMENT

This disclosure was made with Government support under contract number N0019-02-C-3003 awarded by The United States Navy. The Government has certain rights in this disclosure.

TECHNICAL FIELD

The present disclosure relates to tubes for directing flow of fluids, and in particular relates to a tube having an integral, spring-loaded, spherical joint for permitting motion of portions of the tube relative to each other to minimize misalignment stresses to the tube while the tube is directing flow of extremely hot fluids under severe mechanical duress.

BACKGROUND ART

In the field of aircraft engine technology, it is well known that extremely hot fluids and combusting fuel mixtures are directed to flow through varying types of conduits ranging from tubes to augmentors, or after-burner sections of gas turbine engines. As disclosed in U.S. Pat. No. 5,385,015 that issued on Jan. 31, 1995 to Clements et al., which Patent is owned by the owner of all rights in the present disclosure, a pilot assembly is utilized to direct flow of flames through flame passages into an augmentor of a gas turbine engine. The flame passages dispense flames into a combustion section of the augmentor through openings that define a circumferential disposition around a tail cone within the augmentor. A pilot combustor is located within the tail cone, and flames are directed from within the cone to the openings around the tail cone.

The hot gases or flames from the flame passages of the pilot are utilized to efficiently ignite fuel within a combustion chamber of the augmentor when the fuel is injected into the combustion chamber through struts or vanes passing between the tail cone and an outer wall of the augmentor. The openings of the flame passages are defined immediately downstream from the fuel dispensing struts and the flames thereby serve to propagate an efficient combustion of the fuel within the augmentor.

The flame passages of the pilot assembly may be formed by metallic tubes that direct flow of hot gases or flames from the pilot combustor to outlets defined around the tail cone within the augmentor. It has been found that such flame tubes are subject to extraordinary mechanical and thermal stresses as the augmentor is used to substantially enhance the thrust of the gas turbine engine, frequently propelling combustion products at supersonic speeds.

Many efforts have been undertaken to produce fluid conduits that provide for limited movement within the conduit to compensate for axial, rotational and angular stresses. For example, published European Patent Application No. EP 0919774 A3 published on Jun. 2, 1999 shows a "flame tube interconnector" that discloses a joint providing limited movement. The joint includes a first transfer tube having a seat that mates with a spherical or conical seat of a second transfer tube. A spring is included within one of the tubes to draw the two tubes into contact with each other, and exterior flanges include complex throughbores for flexibly bolting the tubes together. While providing for limited axial, radial and rotational motion at the joint, this disclosure exposes the spring to rapid wear by being within the tubes, and the bolting mechanism requires complicated manufacture and installation complexities.

More recently, U.S. Pat. No. 6,709,023 that issued on Mar. 23, 2004, to French discloses a "flexible slide joint" that provides for limited motion in a fluid conduit. French shows first and second tube members secured together by a sliding sealing sleeve member that houses an axially compressible element. One of the two members defines a spherical end portion that abuts an interior slide surface of the sealing sleeve member to provide the limited motion. Like Clements et al., the French disclosure requires complex manufacture, assembly and installation of many separate parts that utilize intricate components to secure the many parts as a single tube.

Therefore, there is a need for a tube having a joint that provides for limited angular, rotational and axial movement between portions of the tube while tolerating flow through the tube of extremely hot fluids and experiencing severe mechanical duress associated with supersonic gas turbine engines.

SUMMARY OF THE INVENTION

The disclosure includes a tube having an integral, spring-loaded, spherical joint. The tube includes a first portion of the tube that has a first mating spherical section at an end of the first portion. A second portion of the tube has a second mating spherical section at an end of the second portion. The first and second mating spherical sections are secured adjacent each other to form a spherical joint configured to permit slidable rotational and angular motion between the first and second spherical sections and to prevent passage of fluid from an interior of the tube out of the tube between the spherical sections. The first portion includes a shoulder defined on the first portion a distance from the end of the first portion including the spherical section and in a direction toward an opposed end of the tube portion. The shoulder protrudes from the tube in a direction away from a fluid passage interior of the tube. The second portion of the tube includes a spring sleeve extending from the second spherical section toward the first tube portion, and the spring sleeve is configured to surround the shoulder on the end of the first portion of the tube. A spring is secured within the spring sleeve adjacent an exterior surface of the first portion and is secured between the shoulder and the spring sleeve. The spring asserts a spring-bias force to maintain the mating spherical sections of the tube portions in contact with each other.

The tube may also have an end of one of the tube portions opposed to the spherical section ends that includes a telescope mount. The telescope mount at the end of the tube defines an expanded ring surrounding the end and the ring is configured to fit within a slide seal of the telescope mount. The slide seal defines a circumferential flange that is dimensioned to receive the expanded ring of the end so that fluid within the tube cannot pass between the slide seal and the expanded ring. The circumferential flange is also dimensioned to permit the expanded ring to slide within the slide seal in a direction parallel to an axis of fluid flow through the tube.

The second portion of the tube may be a discharge portion having the second spherical section adjacent an inlet end of the discharge portion and having an outlet end of the discharge portion of the tube secured to a flame port plate of a gas turbine engine. The discharge portion of the tube may also be secured in rigid association with the flame port plate so that any angular, rotational or axial movement between the discharge portion and the first portion of the tube involves movement only of the first portion of the tube relative to the flame port plate.

The tube having an integral spring-loaded, spherical joint may also be disclosed as having a fluid reception portion that has an inlet end and an opposed cylindrical outlet end, and that also has a fluid discharge portion having a cylindrical inlet end and an opposed outlet end. The cylindrical outlet end of the fluid reception portion of the tube defines a first spherical section surrounding the outlet end of the reception portion. The cylindrical inlet end of the fluid discharge portion of the tube defines a second mating spherical section surrounding the inlet end of the discharge portion. The second mating spherical section is configured to be secured to and overlie the first spherical section of the fluid reception portion to thereby permit slidable rotational and angular movement of the spherical sections adjacent each other and is also configured to prevent passage of fluid from within the tube through an interface between the spherical sections. The cylindrical outlet end of the reception portion of the tube defines a shoulder that is located a distance from the first spherical section. The shoulder extends from at least opposed sides of the outlet end of the tube and the shoulder protrudes from the tube in a direction away from a fluid passage interior of the tube. The shoulder defines a diameter between opposed perimeter edges of the shoulder. The cylindrical inlet end of the discharge portion of the tube defines a spring sleeve that extends from the second spherical section in a direction parallel to a direction of fluid flow through the discharge portion of the tube and that also extends toward the inlet end of the reception portion. The spring sleeve defines an interior void having a sleeve diameter that is greater than the shoulder diameter so that shoulder fits within the spring sleeve. The spring sleeve also defines an interior step at a bottom end of the spring sleeve, and the interior step extends into the interior void of the spring sleeve. The interior step is closer to the entry end of the reception portion of the tube than the shoulder defined on the reception portion of the tube. The interior step also defines a step diameter greater than the shoulder diameter and less than the sleeve diameter.

A spring is secured within the spring sleeve adjacent an exterior surface of the reception portion and is also secured between the shoulder and the interior step of the spring sleeve for asserting a spring-bias force to maintain the mating spherical sections of the tube portions in contact with each other.

The inlet end of the reception portion of the tube may include a telescope mount. The telescope mount defines an expanded ring surrounding the end and the ring is configured to fit within a slide seal of the telescope mount. The slide seal defines a circumferential flange that is dimensioned to receive the expanded ring of the end so that fluid within the tube cannot pass between the slide seal and the expanded ring. The circumferential flange is also dimensioned to permit the expanded ring to slide within the slide seal in a direction parallel to an axis of fluid flow through the tube.

The outlet end of the discharge portion of the tube may be secured to a flame port plate of a gas turbine engine. Additionally, the discharge portion of the tube may be secured in rigid association with the flame port plate so that any angular, rotational or axial movement between the discharge portion and the reception portion of the tube involves movement only of the reception portion of the tube relative to the flame port plate.

The tube may also include a compressible retaining clip configured to have a compressed outer diameter less than the step diameter of the spring sleeve and configured to have a non-compressed outer diameter greater than the step diameter and less than the shoulder diameter. The non-compressed retaining clip is secured adjacent the interior step within the spring sleeve so that the spring is secured between the retaining clip and the shoulder.

The tube having an integral, spring-loaded, spherical joint may also be disclosed as including a first portion of the tube having a first mating spherical section at an end of the first portion, a second portion of the tube having a second mating spherical section at an end of the second portion, wherein the first and second mating spherical sections are secured adjacent each other to form a spherical joint configured to permit slidable, rotational and angular motion between the first and second spherical sections and to prevent passage of fluid from an interior of the tube out of the tube between the spherical sections. An end of one of the first and second portions opposed to the ends including one of the first and second spherical sections includes a telescope mount wherein the telescope mount end defines an expanded ring surrounding the end that is configured to fit within a slide seal of the telescope mount. The slide seal defines a circumferential flange that is dimensioned to receive the expanded ring of the telescope mount end so that fluid within the tube cannot pass between the slide seal and the expanded ring. The circumferential flange is also dimensioned to permit the expanded ring to slide within the slide seal in a direction parallel to an axis of fluid flow through the tube. Also, a telescope mount spring sleeve extends away from the slide seal of the telescope mount in a direction of the fluid flow through the tube. The telescope mount spring sleeve defines a base step that extends toward the tube portion from the spring sleeve to form a wall of the slide seal. A shoulder is defined on the telescope mount end between the expanded ring and the end having the spherical section. The shoulder extends away from an interior of the tube portion, and the shoulder defines a diameter that is less than a diameter of the telescope mount spring sleeve so that the spring sleeve overlies the shoulder. A spring is secured adjacent an exterior surface of the telescope mount end and between the base step and the shoulder to force the shoulder away from the base step, and to thereby maintain the spherical sections of the tube portions in contact with each other.

The second portion of the tube may be a discharge portion having the second spherical section adjacent an inlet end of the discharge portion and having an outlet end of the discharge portion of the tube secured to a flame port plate of a gas turbine engine.

The discharge portion of the tube may be secured in rigid association with the flame port plate so that any angular, rotational or axial movement between the discharge portion and the first portion of the tube involves movement only of the first portion of the tube relative to the flame port plate.

At least one of the first portion or the second portion of the tube may also include an exterior wall surrounding the first and/or second portions. The exterior wall defines a void between the exterior wall and the first portion and/or the second portion of the tube.

Accordingly, it is a general purpose of the present disclosure to provide a tube having an integral, spring-loaded spherical joint that overcomes deficiencies of the prior art.

It is a more specific purpose of the present disclosure to provide a tube having an integral, spring-loaded spherical joint that enhances efficiencies of manufacture, assembly and installation of the tube within complex working environments, and that provides a flame tube having a longer useful life and greater resistance to failure than known flame tubes in similar working environments. These and other purposes and values of the present disclosure will become apparent in the following detailed description and the accompanying drawings.

DESCRIPTION OF THE PREFERRED EMBODIMENTS

Figure 1:
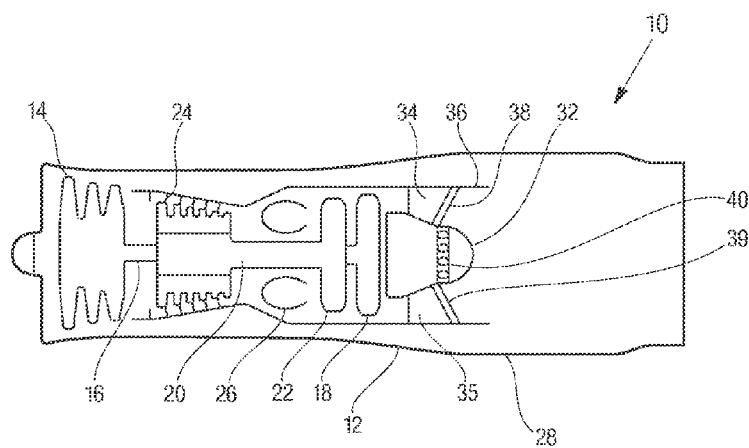
FIG. 1 is a simplified schematic drawing showing twin spool axial flow gas turbine engine with an augmentor, or after-burner

Referring to the drawings in detail, FIG. 1 shows a simplified, schematic representation of a preferred working environment for the present disclosure; namely a gas turbine engine generally designated by the reference numeral 10. The engine 10 includes a hollow engine casing 12 which includes a variety of components and engine modules (not shown) that are not pertinent to the present disclosure. Within the engine casing 12 is a low pressure fan/compressor section 14 interconnected by a shaft 16 to a low pressure turbine 18 which drives the compressor 14. A second shaft 20 is connected to a high pressure turbine 22 which drives a high pressure compressor section 24. An annular burner 26 is disposed between the high pressure compressor 24 and the high pressure turbine 22, and the burner 26 serves to combust fuel so that a portion of the energy extracted from hot combusted accelerated gases powers the turbines which drive the compressors, while remaining energy of the combusted gases produces thrust for driving the gas turbine engine 10 in a desired direction.

An augmentor 28, or after-burner, is located downstream from the low pressure turbine 18 and is used to substantially augment thrust of the engine by directing fuel into the stream of combusted gases. Downstream from the low pressure turbine 18 is a tail cone 32 and a plurality of inlet diffusers 34, 35 that extend from the tail cone 32 to a concentrically space inner liner 36 that serve to direct and stabilize flow of combusted gases discharged from the burner 26 after the gases pass through the turbines 18, 22. Finally, vanes 38, 39 extend from the tail cone 32 to the inner liner 36 in parallel alignment with and rearward of the inlet diffuser 34. The vanes 38, 39 provide passageways for fuel entering the augmentor 28 as described in more detail below. A plurality of flame ports 40 surrounds the tail cone 32, and the flame ports 40 are defined to be adjacent bottom edges of vanes 38, 39.

Figure 2:
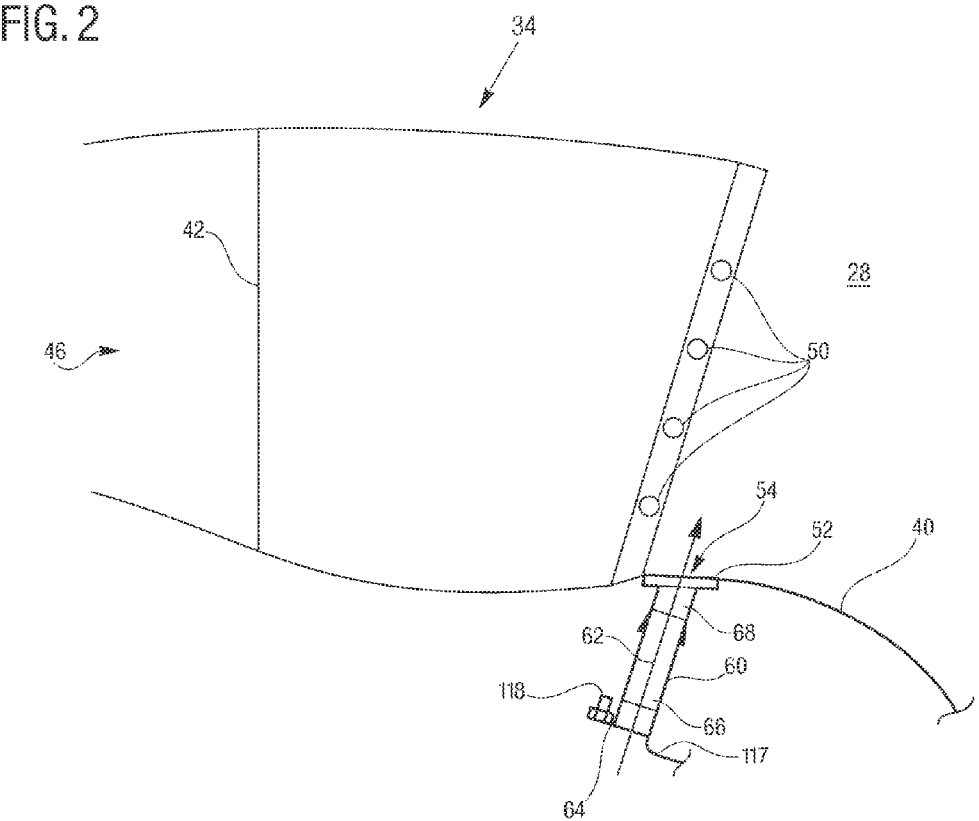
FIG. 2 is simplified, fragmentary schematic drawing showing a burner section of a gas turbine engine augmentor, which is a working environment of the present invention.

FIG. 2 shows a fragmentary, expanded view of an inlet diffuser 34 of FIG. 1 that includes a strut 42. A passageway 46 directs flow of combusted gases from downstream of the turbines 18, 22 into the augmentor 28. Fuel apertures 50 on the downstream side of the strut 42 dispense fuel into gases passing through the passageway 46.

FIG. 2 also shows a flame port plate 52 that defines an exemplary flame port 54 through which a flame (not shown) passes to ignite any fuel passing through the fuel apertures 50. Shown also in FIG. 2 is a simplified view of a tube 60 of the present invention secured to the flame port plate 52. An arrow 62 shown passing through the tube 60 indicates an axis of and a direction of fluid flow through the tube. The tube 60 is also secured to a support 64.

Whenever the fuel apertures 50 dispense fuel in the augmentor 28, flames passing from a combustor (not shown) adjacent the support 64 pass through the tube 60 and through the flame port 54 to ignite the fuel. This creates extraordinary thermal and mechanical duress on all components of the gas turbine engine 10, and especially on the flame port plate 54 and the tube 60 secured thereto. As described in detail below, the present tube 60 having an integral, spring-loaded, spherical joint minimizes deleterious effects of such duress on the tube 60 and also minimizes any misalignment of flow of flames through the flame port plate 52 by permitting limited angular, rotational and axial movement between a reception portion 66 of the tube 60 and a discharge portion 68 of the tube 60.

Figure 3:
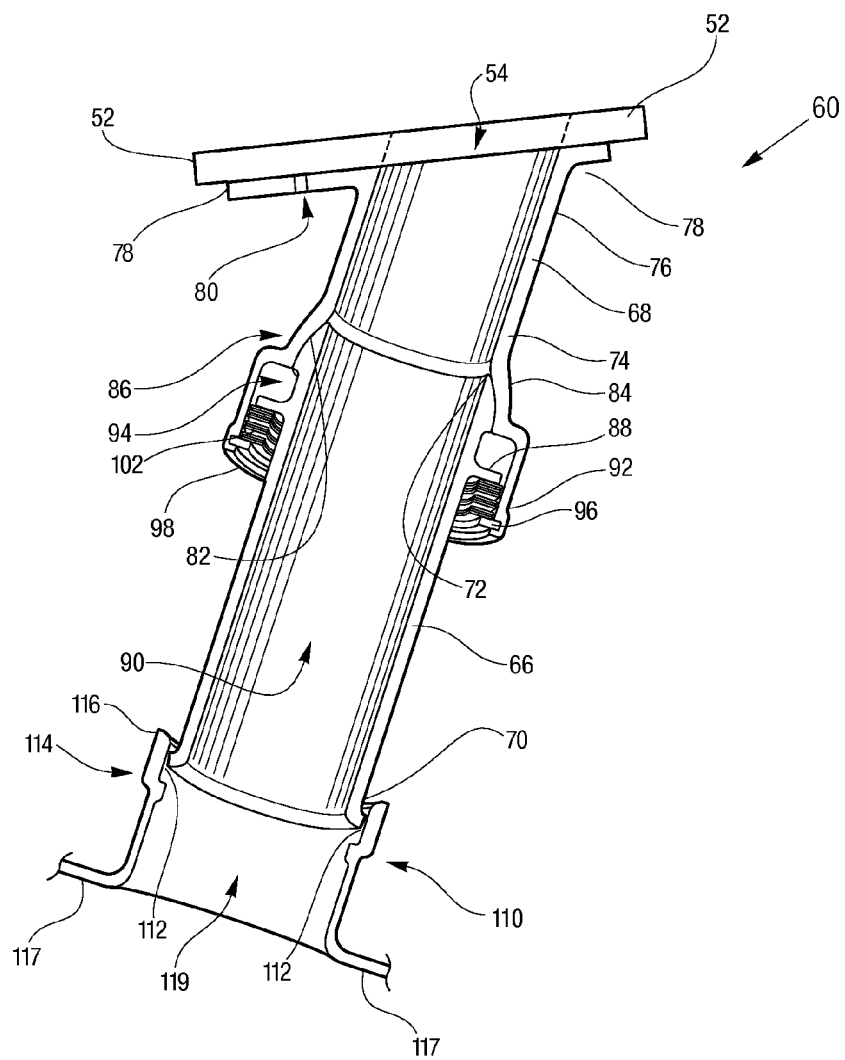
FIG. 3 is a cross-sectional view of a tube having an integral, spring-loaded, spherical joint constructed in accordance with the present invention.

FIG. 3 shows a cross-sectional view of the tube 60 having an integral, spring-loaded, spherical joint constructed in accordance with the present disclosure. The tube 60 includes the fluid reception 66 or first portion 66 of the tube 60, and the fluid reception portion 66 has an inlet end 70 and an opposed cylindrical outlet end 72. A fluid discharge portion 68 or second portion 68 has a cylindrical inlet end 74 and an opposed outlet end 76. The outlet end 76 of the discharge portion 68 also includes a mounting bracket 78 defining at least one bolt throughbore 80 for securing the discharge portion 68 to the flame port plate 52.

The cylindrical outlet end 72 of the fluid reception portion 66 of the tube 60 defines a first spherical section 82 surrounding the outlet end 72 of the reception portion 66 of the tube 60. As shown in FIG. 3, the first spherical section 82 may be convex, or alternatively may be concave (not shown). The first spherical section 82 may also be defined on the opposite or inlet end 70 or the reception portion 66 of the tube. The cylindrical inlet end 74 of the fluid discharge portion 68 of the tube 60 defines a second spherical section 84 surrounding the inlet end 74 of the discharge portion 66 of the tube 60. The first spherical section 82 and the second spherical section 84 may also include wear surfaces that may be separable (not shown) and seal pieces (not shown) between the sections 82, 84 that enhance longevity of the spherical sections 82, 84 and minimize any fluid leaking between the sections 82, 84. FIG. 3 shows the second spherical section 84 as concave, but it may be convex (not shown). It is necessary, however, that the first spherical section 82 and the second spherical section 84 define mating or different spherical section surfaces configured to prevent passage of fluids between the surfaces 82, 84 whenever the spherical section 82, 84 are in intimate contact with each other, while the spherical sections 82, 84 are secured in slidable association with each other. The two spherical sections 82, 84 form a spherical joint 86 that is integral with the tube 60.

Again and for clarity, the concave or second spherical section 84 (shown in FIG. 3) is configured to be secured to and to overlie the first or convex spherical section 82 of the fluid reception portion 66 to thereby permit slidable movement of the spherical sections 82, 84 adjacent each other. The spherical sections 82, 84 are configured to also prevent passage of fluid from within the tube through an interface of the spherical sections 82, 84 of the tube.

The cylindrical outlet end 72 of the first or reception portion 66 of the tube defines a shoulder 88 below (wherein "below" in a direction toward the inlet end 70 of the reception portion 66) the convex spherical section 82 shown in FIG. 3. The shoulder 88 extends from at least opposed sides of the outlet end 72, and may include a plurality of shoulder tabs (not shown) or a surrounding shoulder 88. The shoulder 88 protrudes from the outlet end 72 of the reception portion 66 of the tube 60 in a direction away from a fluid passage interior 90 of the tube 60, and the shoulder 88 defines a shoulder diameter between opposed perimeter edges of the shoulder 88.

Figure 4:
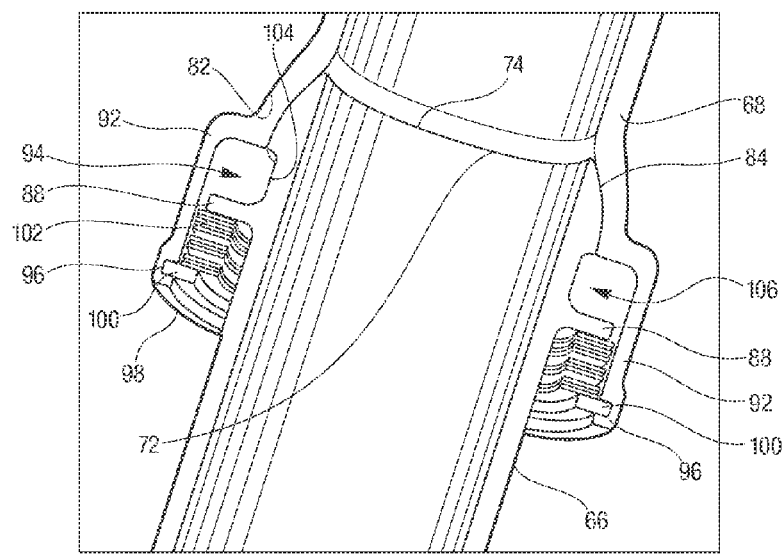
FIG. 4 is fragmentary, expanded view of the FIG. 3 tube, showing an expanded view of mating spherical sections or portions of the tube forming a spherical joint, showing a spring sleeve encasing a shoulder of an outlet end of a reception portion of the tube, and showing a spring within the spring sleeve secured between a shoulder of the outlet end and a retaining clip secured adjacent an interior step of the spring sleeve.

The cylindrical inlet end 74 of the discharge 68 or second portion of the tube 60 defines a spring sleeve 92 that extends from the concave or second spherical section 84 and extends in a direction toward the entry end 70 of the reception portion 66 of the tube 60. The spring sleeve 92 defines an interior void 94 having a sleeve diameter greater than the shoulder diameter so that shoulder 88 of the outlet end 72 of the reception portion 66 fits within the spring sleeve 92. As best shown in FIG. 4, the spring sleeve 92 defines an interior step 96 at a bottom end 98 of the spring sleeve 92, and the step 96 extends into the interior void 94 of the spring sleeve 92. The interior step 96 defines a step diameter that is greater than the shoulder diameter and that is less than the sleeve diameter. The interior step 96 is closer to the entry end 70 of the reception portion 66 than is the shoulder 88 defined on the reception portion 66 of the tube 60.

Figure 5:
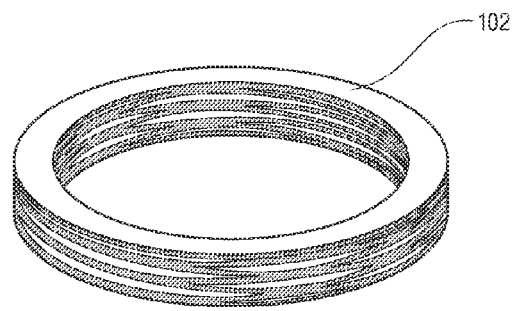
FIG. 5 is a perspective view of a wave spring suitable for use in the tube having an integral, spring-loaded, spherical joint.

As best shown in FIG. 4, a compressible retaining clip 100 is configured to have a compressed outer diameter less than the step diameter and is configured to have a non-compressed outer diameter greater than the step diameter and an inner diameter less than the shoulder diameter. As described above, the retaining clip 100 may be compressed to fit within the spring sleeve 92, and then it may be expanded so that the retaining clip 100 sits on the step 96 of the spring sleeve 92, but cannot pass over the shoulder 88 at the outlet end 72 of the reception portion 66 of the tube 60. The non-compressed retaining clip 100 is secured adjacent the interior step 96 within the spring sleeve 92. A spring, such as a "wave spring" 102 shown alone in FIG. 5, or a standard coil spring (not shown) is secured between the retaining clip 100 and the shoulder 88. The spring 102 is configured to assert a spring-bias force between the shoulder 88 and the non-compressed retaining clip 100 to thereby force and maintain the spherical section 82 of the outlet end 72 of the reception portion 66 of the tube 60 against the mating spherical section 84 of the inlet end 74 of the discharge portion 68 of the tube 60.

While FIGS. 3 and 4 show the retaining clip 100, shoulder 88 and spring 102 therebetween as the integral spring-loaded portion of the tube 60, it is to be understood that any spring loading that is integral with (meaning mechanically connected to and forming a part of the tube 60) may also be utilized. For example, while the compressible retaining clip 100 provides an efficient mechanism for securing the spring 102 between the shoulder 88 and the step 96, alternative spring securing mechanisms may be utilized, such as the spring sleeve 92 defining screw threads or projecting tabs and a retainer being screwed into the spring sleeve 92 or a notched washer being positioned upon the projecting tabs, etc. For purposes herein, therefore, the spring-loaded aspect of the tube 60 will be broadly characterized as a spring 102 secured within the spring sleeve 92 between the shoulder 88 of a first portion of the tube 60 and the spring sleeve 92 of a second portion of the tube 60 for asserting a spring-bias force to draw the spherical sections 82, 84 of the tube portions toward each other.

As also best shown in FIG. 4, the shoulder 88 may be defined a sufficient distance away from the spherical section 82 at the outlet end 72 of the reception portion 66 of the tube 60 so that a displacement region 104 is defined between the shoulder 88 and the spherical section 82. As the spring sleeve 92 overlies the shoulder 88 and outlet end 72 of the spherical section 82, a displacement void 106 is defined between the shoulder 88 and the spherical section 82. As the concave spherical section 84 of the inlet end 74 of the discharge portion 68 of the tube 60 slides adjacent the mating convex spherical section 82 of the outlet end 72 of the reception portion 66 of the tube 60, some of the concave spherical section 84 moves into the displacement void 106 to thereby permit slidable motion of the spherical sections 82, 84 relative to each other.

As shown in FIG. 3, the tube 60 may also include a telescope mount 110 wherein the inlet end 70 of the reception portion 66 defines an expanded ring 112 surrounding the inlet end 70 and configured to fit within a slide seal 114 of the telescope mount 110. The slide seal 114 defines a circumferential flange 116 dimensioned to receive the ring 112 of the inlet end 70 so that fluid within the tube 60 cannot pass between the slide seal 114 and the expanded ring 112. The flange 116 is also dimensioned to permit the ring 112 to slide within the slide seal 114 in a direction parallel to an axis 62 of fluid flow through the inlet end 70, thereby permitting sealed axial motion of the tube 60 along and parallel to the axis 62 of fluid flow through the tube 60. FIG. 3 shows that the telescope mount 110 portion of the tube 60 includes a securing extension 117 for securing the telescope mount 110 and tube 60 to the support 64, such as by a standard screw and bolt mechanism 118. FIG. 3 also shows that the support 64 may also define a flame outlet tunnel 119 for directing flame out of the combustor (not shown), through the tunnel 119 and into the tube 60. The flame outlet tunnel 119 may be inserted into the telescope mount 110, or into the inlet end 70 of the reception portion 66 of the tube 60.

In an ordinary working environment of the integral, spring-loaded spherical joint tube 60, such as the gas turbine engine 10 described above, the inlet end 70 of the reception portion 66 of the tube 60 is secured to the support 64 (shown in FIG. 2) of an adjacent pilot combustor (not shown) so that flames from the pilot combustor pass from the inlet end 70 of the reception portion 66 of the tube 60 and pass out of the outlet end 76 of the discharge portion 68 of the tube 60. As described with respect to FIG. 2, the outlet end 76 of the discharge portion 68 of the tube 60 may be secured in rigid association with the flame port plate 52 adjacent an exterior surface of the tail cone 32 within the augmentor 28 of the gas turbine engine 10. This permits flames or extremely hot gases to pass out of the tube 60 and through the flame port 54 into the augmentor 28.

By having the discharge portion 68 secured in rigid association with the flame port plate 52, it is meant that any angular, rotational or axial movement between the discharge portion 68 and the reception portion 66 and/or the telescoping end 110 of the tube 60 exclusively involves movement of the reception portion 66 of the tube 60 relative to the flame port plate 52. In other words, while the tube 60 provides for movement between the discharge portion 68 and reception portion 66, the tube 60 may be secured to the flame port plate 52 so that an axis of fluid flow out of the discharge portion 68 of the tube 60 through the flame port 54 is always the same, while the reception portion 66 of the tube 60 experiences limited movement relative to the flame port plate 52.

Figure 6:
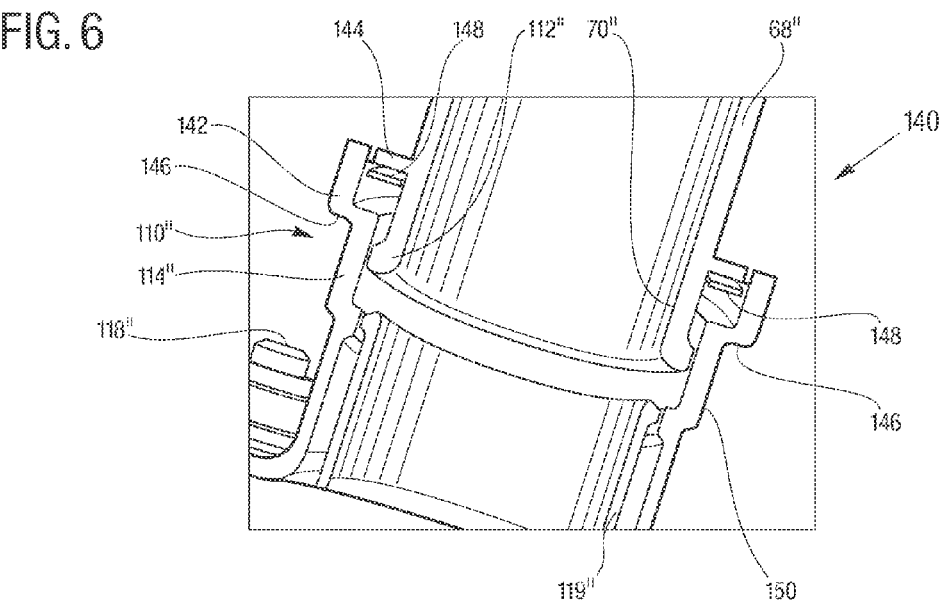
FIG. 6 is a cross-sectional, fragmentary view of a telescope mount spring sleeve embodiment of the tube showing a spring sleeve extending from a slide seal of a telescope mount of the tube, and showing the spring sleeve overlying a shoulder defined above the inlet end of the reception portion of the tube.

As shown in FIG. 6, in a further alternative telescope mount spring sleeve tube embodiment 140, a second spring sleeve 142 may extend away from a slide seal 114" of the telescope mount 110" in a direction of the fluid flow through the tube 60". (In the FIG. 6 drawing, components that are virtually identical to components in the FIGS. 3 and 4 embodiments are shown with reference numerals that are double primes of the FIGS. 3 and 4 reference numerals. For example, in FIG. 6, the FIG. 3 telescope mount 110 is shown as 110".) Additionally, the inlet end 70" or telescope mount end 70" of the reception portion 68" of the tube 140 may define an inlet-end shoulder 144, similar to the shoulder 88 described above, so that the inlet-end shoulder 144 extends at least from opposed sides of the inlet end 70" of the reception portion 66" of the tube 140.

The inlet-end shoulder 144 defines an inlet-end shoulder 144 diameter that is less than a diameter of the telescope mount spring sleeve 142 so that the spring sleeve 142 may overlie the inlet-end shoulder 144. The telescope mount spring sleeve tube 140 defines a base step 146 extending toward the tube 140 from the spring sleeve 142 to a wall of the slide seal 114". A second spring 148 is secured between the base step 146 and the inlet-end shoulder 144 to force the shoulder 144 away from the base step 146, and to thereby force the spherical section 82 of the outlet end 72 of the reception portion 66 (shown in FIG. 3) of the tube 140 into intimate contact with the spherical section 84 of the inlet end 74 of the discharge portion 68 (shown in FIG. 3) of the tube 140. Because the second spring 148 is encased within the telescope mount spring sleeve 142 of the tube 140, the telescope mount spring sleeve embodiment of the tube 140 also describes a joint 86 having an integral second spring 148. In particular working environments, being able to slide the inlet end 70" of the reception portion 66" of the tube 140 into the telescope mount spring sleeve 142 facilitates assembly, and dispenses with any need to compress a retainer clip 100 to secure the second spring 148 within the spring sleeve 142 in the assembly process and/or installation process. It is to be understood that the telescope mount spring sleeve tube embodiment 140 does not require usage of the spring 102 between the spherical sections 82, 84 because the second spring 148 achieves the same function of the spring 102 of applying a securing force to maintain the spherical sections 82, 84 in intimate, fluid-sealing contact with each other.

The present inventive tubes 60, 140 having an integral, spring-loaded, spherical joint 86 provide for efficient manufacture, assembly and installation of the tubes 60, 140, in particular within very constrained working environments, such as along with a plurality of identical or similar tubes within or adjacent the tail cone 32 of a gas turbine engine 10.

All patents, published patent applications and related patent documents referred to in this document are incorporated herein by reference thereto.

While the above disclosure has been presented with respect to the described and illustrated embodiments of tubes 60, 140 having integral, spring-loaded, spherical joints 86, it is to be understood that the disclosure is not to be limited to those alternatives and described embodiments. For example, the tubes 60, 140 are disclosed primarily with respect to the working environment of a gas turbine engine 10, however the tubes 60, 140 may be utilized in alternative working environments wherein fluid flow directing tube are exposed to extremes of thermal and mechanical duress. Accordingly, reference should be made primarily to the following claims rather than the foregoing description to determine the scope of the disclosure.

What is claimed is:

1. A tube having an integral, spring-loaded, spherical joint, the tube comprising:
   a. a first portion of the tube having a first mating spherical section at an end of the first portion, a second portion of the tube having a second mating spherical section at an end of the second portion, the first and second mating spherical sections being secured adjacent each other to form a spherical joint configured to permit slidable rotational and angular motion between the first and second spherical sections and to prevent passage of fluid from an interior of the tube out of the tube between the spherical sections;
   b. the first portion including a shoulder defined on the first portion a distance from the end of the first portion including the spherical section and in a direction toward an opposed end of the tube portion, and the shoulder protruding from the tube in a direction away from a fluid passage interior of the tube;
   c. the second portion including a spring sleeve extending from the second spherical section toward the first tube portion, the spring sleeve being configured to surround the shoulder on the end of the first portion of the tube;
   d. a spring secured within the spring sleeve adjacent an exterior surface of the first portion and secured between the shoulder and the spring sleeve for asserting a spring-bias force to maintain the mating spherical sections of the tube portions in contact with each other;
   e. wherein an end of one of the first and second portions opposed to the ends including one of the first and second spherical sections includes a telescope mount wherein the end defines an expanded ring surrounding the end and configured to fit within a slide seal of the telescope mount, the slide seal defining a circumferential flange dimensioned to receive the expanded ring of the end so that fluid within the tube cannot pass between the slide seal and the expanded ring, and the circumferential flange also dimensioned to permit the expanded ring to slide within the slide seal in a direction parallel to an axis of fluid flow through the tube; and,
   f. wherein the second portion of the tube is a discharge portion having the second spherical section adjacent an inlet end of the discharge portion and having an outlet end of the discharge portion of the tube secured to a flame port plate of a gas turbine engine.

2. The tube having an integral, spring-loaded, spherical joint of claim 1, wherein the discharge portion of the tube is secured in rigid association with the flame port plate so that any angular, rotational or axial movement between the discharge portion and the first portion of the tube involves movement only of the first portion of the tube relative to the flame port plate.

3. A tube having an integral spring-loaded, spherical joint, the tube comprising:
   a. a fluid reception portion having an inlet end and an opposed cylindrical outlet end, and a fluid discharge portion having a cylindrical inlet end and an opposed outlet end;
   b. the cylindrical outlet end of the fluid reception portion of the tube defining a first spherical section surrounding the outlet end of the reception portion, and the cylindrical inlet end of the fluid discharge portion of the tube defining a second mating spherical section surrounding the inlet end of the discharge portion, and the second mating spherical section being configured to be secured to and overlie the first spherical section of the fluid reception portion to thereby permit slidable rotational and angular movement of the spherical sections adjacent each other and configured to also prevent passage of fluid from within the tube through an interface between the spherical sections;

c. the cylindrical outlet end of the reception portion of the tube defining a shoulder a distance from the first spherical section, and the shoulder protruding from the tube in a direction away from a fluid passage interior of the tube and defining a shoulder diameter between opposed perimeter edges of the shoulder;

d. the cylindrical inlet end of the discharge portion of the tube defining a spring sleeve extending from the second spherical section in a direction parallel to a direction of fluid flow through the discharge portion of the tube and toward the inlet end of the reception portion, the spring sleeve defining an interior void having a sleeve diameter greater than the shoulder diameter so that shoulder fits within the spring sleeve, the spring sleeve defining an interior step at a bottom end of the spring sleeve and extending into the interior void of the spring sleeve, the interior step being closer to the entry end or the reception portion of the tube than the shoulder defined on the reception portion of the tube, the interior step defining a step diameter greater than the shoulder diameter and less than the sleeve diameter;

e. a spring secured within the spring sleeve adjacent an exterior surface of the reception portion and secured between the shoulder and the interior step of the spring sleeve for asserting a spring-bias force to maintain the mating spherical sections of the tube portions in contact with each other;

f. the tube further comprising the inlet end of the reception portion including a telescope mount wherein the inlet end defines an expanded ring surrounding the inlet end and configured to fit within a slide seal of the telescope mount, the slide seal defining a circumferential flange dimensioned to receive the expanded ring of the inlet end so that fluid within the tube cannot pass between the slide seal and the expanded ring, and the circumferential flange also dimensioned to permit the expanded ring to slide within the slide seal in a direction parallel to an axis of fluid flow through the tube; and, g. wherein the outlet end of the discharge portion of the tube is secured to a flame port plate of a gas turbine engine.

4. The tube having an integral, spring-loaded, spherical joint of claim 3, wherein the discharge portion of the tube is secured in rigid association with the flame port plate so that any angular, rotational or axial movement between the discharge portion and the reception portion of the tube involves movement only of the reception portion of the tube relative to the flame port plate.

5. The tube having an integral, spring-loaded, spherical joint of claim 3, further comprising a compressible retaining clip configured to have a compressed diameter less than the step diameter and configured to have a non-compressed diameter greater than the step diameter and less than the shoulder diameter, the non-compressed retaining clip being secured adjacent the interior step within the spring sleeve so that the spring is secured between the retaining clip and the shoulder.

6. A tube having an integral, spring-loaded, spherical joint, the tube comprising:

a. a first portion of the tube having a first mating spherical section at an end of the first portion, a second portion of the tube having a second mating spherical section at an end of the second portion, the first and second mating spherical sections being secured adjacent each other to form a spherical joint configured to permit slidable, rotational and angular motion between the first and second spherical sections and to prevent passage of fluid from an interior of the tube out of the tube between the spherical sections;

b. an end of one of the first and second portions opposed to the ends including one of the first and second spherical sections including a telescope mount wherein the telescope mount end defines an expanded ring surrounding the telescope mount end and configured to fit within a slide seal of the telescope mount, the slide seal defining a circumferential flange dimensioned to receive the expanded ring of the end so that fluid within the tube cannot pass between the slide seal and the expanded ring, and the circumferential flange also dimensioned to permit the expanded ring to slide within the slide seal in a direction parallel to an axis of fluid flow through the tube;

c. a telescope mount spring sleeve extending away from the slide seal of the telescope mount in a direction of the fluid flow through the tube, and the telescope mount spring sleeve defining a base step extending toward the tube portion from the spring sleeve to form a wall of the slide seal;

d. a shoulder defined on the telescope mount end between the expanded ring and the end having the spherical section, the shoulder extending away from an interior of the tube portion, and the shoulder defining a diameter that is less than a diameter of the telescope mount spring sleeve so that the spring sleeve overlies the shoulder; and, e. a spring secured adjacent an exterior surface of the telescope mount end and between the base step and the shoulder to force the shoulder away from the base step, and to thereby maintain the spherical sections of the tube portions in contact with each other.

7. The tube having an integral, spring-loaded, spherical joint of claim 6, wherein the second portion of the tube is a discharge portion having the second spherical section adjacent an inlet end of the discharge portion and having an outlet end of the discharge portion of the tube secured to a flame port plate of a gas turbine engine.

8. The tube having an integral, spring-loaded, spherical joint of claim 7, wherein the discharge portion of the tube is secured in rigid association with the flame port plate so that any angular, rotational, or axial movement between the discharge portion and the first portion of the tube involves movement only of the first portion of the tube relative to the flame port plate.

* * * * *